United States Patent [19]

Green et al.

[11] Patent Number: 5,346,683

[45] Date of Patent: Sep. 13, 1994

[54] UNCAPPED AND THINNED CARBON NANOTUBES AND PROCESS

[75] Inventors: Malcolm L. H. Green; Shik C. Tsang, both of Oxford, United Kingdom

[73] Assignee: Gas Research Institute, Chicago, Ill.

[21] Appl. No.: 37,573

[22] Filed: Mar. 26, 1993

[51] Int. Cl.$^5$ .............................................. D01F 9/12
[52] U.S. Cl. .............................. 423/447.2; 422/312; 423/460; 423/DIG. 39; 423/DIG. 40
[58] Field of Search ............... 428/367, 376, 377, 371; 423/445 B, 447.1, 447.2, 460, DIG. 39, DIG. 40; 422/312, 241

[56] References Cited

U.S. PATENT DOCUMENTS 5,094,906  3/1992  Witzke et al. ..................... 428/220

OTHER PUBLICATIONS

Ajayan et al, "Opening carbon nanotubes with oxygen and implications for filling", *Nature*, vol. 362, Apr. 8, 1993, pp. 522–525.

Tsang et al., "Thinning and opening carbon nanotubes by oxidation using carbon dioxide", *Nature*, vol. 362, Apr. 8, 1993, pp. 520–522.

S. Iijima, "Helical Microtubules of Graphitic Carbon," *Nature*, vol. 354, pp. 56–58 (1991).

W. Kratschmer, L. Lamb, K. Fostiropoulos & D. Huffman, "Solid $C_{60}$: A New Form of Carbon," *Nature*, vol. 347, pp. 354–358 (1990).

T. Ebbesen & P. Ajayan, "Large-scale Synthesis of Carbon Nanotubes," *Nature*, vol. 358, pp. 220–221 (1992).

P. Ajayan & S. Iijima, "Capillarity–induced Filling of Carbon Nanotubes," *Nature*, vol. 361, pp. 333–334 (1993).

S. Iijima, T. Ichihashi & Y. Ando, "Pentagons, Heptagons and Negative Curvative in Graphite Microtubule Growth," *Nature*, vol. 356, pp. 776–778 (1992).

*Primary Examiner*—Robert J. Warden
*Assistant Examiner*—Krisanne M. Thornton
*Attorney, Agent, or Firm*—Speckman, Pauley & Fejer

[57] ABSTRACT

Uncapped and thinned carbon nanotubes are produced by reaction with a flowing reactant gas capable of reaction selectively with carbon atoms in the capped region of nanotubes. The uncapped and thinned nanotubes provide open compartments for insertion of chemicals and exhibit enhanced surface area with modified physical and chemical properties.

22 Claims, 4 Drawing Sheets

UNCAPPED AND THINNED CARBON NANOTUBES AND PROCESS

BACKGROUND OF THE INVENTION

1. Field of the Invention

This invention relates to uncapped and thinned carbon nanotubes and the process for uncapping and thinning carbon nanotubes. Uncapped carbon nanotubes are useful for a wide variety of chemical reactions and may be enhanced by filling with another chemical reagent or catalyst.

2. Description of Related Art

Carbon nanotubes have been described as coaxial helical tubes of graphitic sheets, ranging in number from two to about fifty, with their ends closed by caps in S. Iijima, Helical M. of graphitic Carbon, Nature, 354, 56–58, (1991). The carbon nanotubes are produced in a manner very similar to that used to mass produce $C_{60}$ as described in W. Kratschmer, L. D. Lamb, K. Fostiropoulos and D. R. Huffman, Solid $C_{60}$: A New Form of Carbon, Nature, 347, 354–358, (1990). A method for producing carbon nanotubes in bulk is described in T. W. Ebbesen and P. M. Ajayan, Large-scale Synthesis of Carbon Nanotubes, Nature, 358, 220–221, (1992). The carbon nanotubes produced by Eddesen, et al were reported to be capped at their tips by pentagons. It has been reported that lead can enter a very small fraction of the capped nanotubes by treating them with molten lead. P. M. Ajayan and S. Iijima, Nature, 361, 333–334, (1993).

SUMMARY OF THE INVENTION

Uncapped nanotubes provide a new spectrum of chemical reaction possibilities. Much larger carbon surface area would be provided for reaction sites and many reactions could be enhanced by introduction of chemical reactants into the hollow tubes. Exposure of empty uncapped nanotubes to chemical vapors, liquids or solutions would cause entry of the chemical into the void volume of the uncapped tubes. The contents of filled tubes may be exchanged by exposure to other chemicals. The physical and chemical properties of filled nanotubes depends upon the contained material and can be tailored for a wide variety of uses, providing novel electrical, magnetic, or other bulk properties. Uncapped nanotubes can have selective catalytic properties and may be used in shape selective catalysis. The uncapped nanotubes could be used as carriers, such as for drugs or enzymes. The uncapped nanotubes could be useful for molecular sieve applications of separations and for selective gas uptake and gas storage, such as natural gas, methane, storage. In addition to producing uncapped tubes, the process of this invention can controllably reduce the thickness of the tubes. The number of layers of the tube can be controlled and a tube having a single layer can be prepared by the process of this invention.

The carbon nanotubes may be uncapped by treating the capped nanotubes with a reactant gas or vapor under controlled conditions of temperature and pressure to selectively attack the end caps of the nanotubes causing erosion of the carbon of the caps and eventual removal of the caps. The reactant gas reacts and removes carbon in the cap exposing the reactive terminal cylinder carbon fringes leading to subsequent stripping of the outer carbon layers. The products of such reaction are volatile under reaction conditions and are removed by the gas flow. Suitable reactant gases comprise mild oxidizing or reducing agents which react with carbon to form a gaseous product and may also contain components to improve the selectivity of uncapping or to control the degree of reactivity of the reactant gas.

DESCRIPTION OF PREFERRED EMBODIMENTS

Figure 1A:
FIG. 1a is a high resolution electron micrograph showing the cap region of a capped carbon nanotube.

Carbon nanotubes may be uncapped according to this invention by being treated in a flowing reactant gas at a temperature and pressure sufficient to remove carbon atoms selectively from the end caps, causing erosion and eventual removal of the end caps, and carrying the products of such reaction away in the gas flow. Mild oxidizing agents and reducing agents forming gaseous products upon reaction with carbon are suitable reactants for use in this process. Suitable temperatures for conduct of the process of this invention are about $-100°$ to about $2000°$ C., preferably about $500°$ to about $1000°$ C., for many of the reactions. Suitable pressures for conduct of the process of this invention are about $10^{-3}$ torr to about 200 bar, preferably about 1 to about 20 bar. The process is conducted by passing gas comprising suitable reactant gas over carbon nanotubes under the above conditions for a time sufficient to achieve the desired uncapping or tube thinning of up to 4 weeks, usually in the range of about 4 to about 15 hours. The products of reaction are carried off in the gas flow. The reaction may be carried out in any flow reactor as known to the art, such as a quartz tubular reactor.

Suitable reactant gas may be any gas for reaction with carbon to result in a gaseous carbon containing product. Suitable reactant gases include $CO_2$, $O_2$, $O_3$, $H_2O$, NO. $N_2O$, $NO_2$, oxides of sulfur, such as $SO_2$, $H_2$, halogen, such as $F_2$, $Br_2$, $I_2$, $Cl_{12}$ or a source of reactive halogen such as, $CCl_4$, $ICl_3$, HCl, HF, HBr, an oxide of phosphorous such as $P_2O_5$, and mixtures thereof. The reactant gas may be in an inert diluent or carrier gas, such as $N_2$ or a noble gas, such as, He, At, Ne, Kr, Xe and mixtures thereof in amounts of about 1/1 up to 1/20 or greater. The diluent or carrier gas controls the partial pressure of the reactant gas to affect the rate of uncapping or thinning the tubes and serve to assist in thermal control in the reactor. The reactant gas may also contain another gas or vapor which enhances the carbon stripping process. Preferred reactant gas for use in this invention comprises $CO_2$, in which case the reaction is $C + CO_2 \rightarrow 2CO$, and $N_2O$, in which case the reaction is $C + N_2O \rightarrow CO + N_2$.

Prior to treatment of the capped carbon nanotubes with the reactant gas according to the above described process, the capped carbon nanotubes may be pretreated with a catalyst comprising a transition metal, such as Ni, Rh, Pt, Ir and mixtures thereof to enhance the rate and selectivity of uncapping and thinning of the nanotubes. The transition metal catalyst may be added to the capped carbon nanotubes as a vapor or as a solution of suitable compounds of the transition metals.

Observation of uncapped carbon nanotubes obtained by the process of this invention indicates the outer carbon layers at the tip of the cap selectively react with the reactant gas and are subsequently stripped off. The selective attack of the curved part of the cap indicates greater activity which may be due to greater strain and the presence of pentagonal rings. Destruction of the cap exposes the terminated cylinder layers which can then be further eroded resulting in the formation of thinner tubes. The observed increase in surface area of nanotubes subjected to the process of this invention may result from a combination of reduction in the average tube diameter and the uncapping of some of the nanotubes. Carbon nanotubes treated according to this invention may contain fewer carbon layers than prior to treatment, generally in the range of on to about thirty carbon tube layers and preferebly about one to about eight concentric carbon tube layers. The process of this invention can result in carbon nanotubes having a single carbon tube layer.

The following Example is set forth in detail using specific materials and process conditions to aid in the understanding of this invention and should not be considered to limit the invention in any way.

EXAMPLE

Figure 1B:
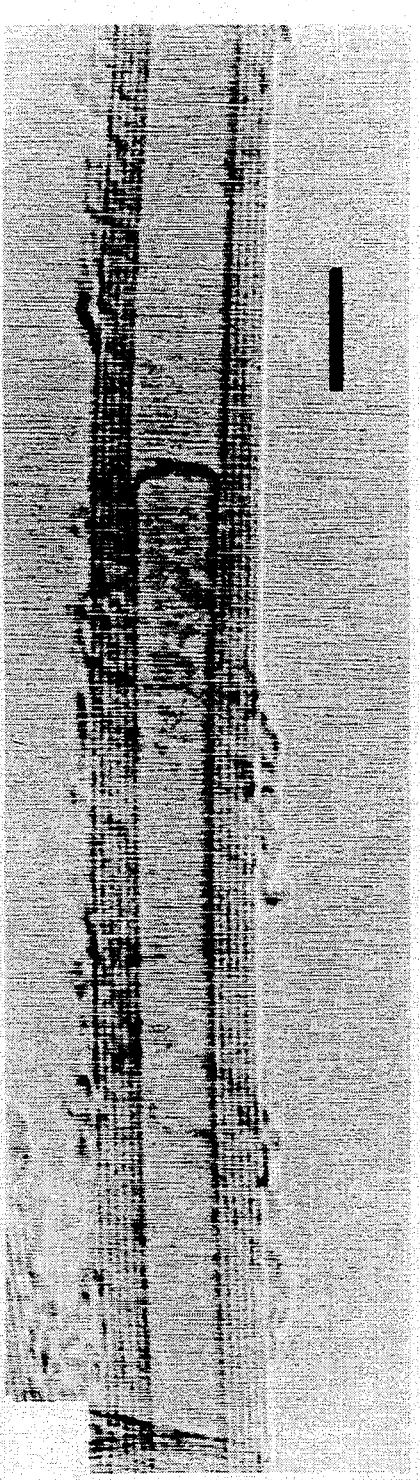
FIG. 1b is a high resolution electron micrograph showing a graphitic layer dividing the central tube of a carbon nanotube.

Carbon nanotubes were prepared using a carbon arc. An arc was struck between two electrolytic grade graphite rods, 8 mm O.D., 15 cm length. purity >99%, in 100 torr of helium using a dc voltage of 30 V and a current of 180–200 A. The anodic graphite rod evaporated and the cathodic graphite rod increased in length. Approximately 20–30 percent of the carbon vaporized from the anode distilled onto the cathode, resulting in a gain in length of the cathode of about 3–4 cm. The nanotube material was found at the black central core of the cathodic rod. The surface area of the nanotube material was measured by the BET method using $N_2$ at $-196°$ C. and found to have a surface area of 21.0 $m^2g^{-1}$. Specimens were prepared for HRTEM (High Resolution Transmission Electron Microscopy) by dispersion of the material in chloroform and deposition onto holey carbon film. The specimens were examined using a JEOL 4000FX microscope, operated at optimum defocus with an accelerating voltage of 100 KV. Examination of the freshly prepared nanotubes showed that they were invariably capped. FIG. 1a shows the complicated morphology in the cap area. It was also frequently observed that the nanotubes were frequently traversed by one or more graphitic layers as shown in FIG. 1b. The micrographs show the same number of lattice fringes on each side of the central cavity indicating the nanotubes have concentric carbon layers rather than a spiral structure. An extensive survey of the nanotubes showed that all the tubes were seamless with no broken caps and the continuity of the fringes could be traced. The internal diameters of the carbon nanotubes was about 8 to about 100 angstrom.

Figure 2A:
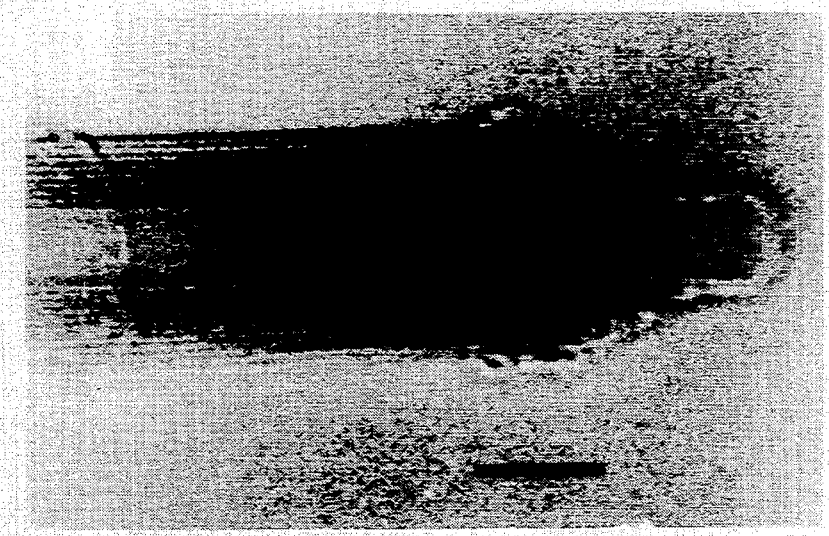
FIG. 2a is a high resolution electron micrograph of the tip region of a carbon nanotube treated with $CO_2$ according to this invention showing outer layers of the cap stripped off.
Figure 2B:
FIG. 2b is a high resolution electron micrograph of the tip region of a carbon nanotube treated as in FIG. 2a showing some terminated fringes inside the tube.
Figure 2C:
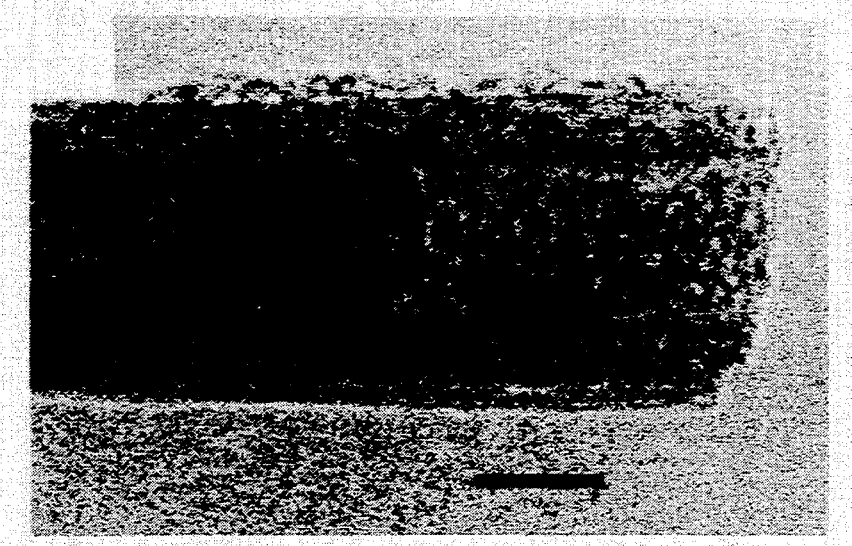
FIG. 2c is a high resolution electron micrograph of the tip region of a carbon nanotube treated as in FIG. 2a showing a completely uncapped tube with some amorphous material in the tube.
Figure 3:
FIG. 3 is a high resolution electron micrograph of the tip region of a carbon nanotube treated as in FIG. 2a showing a selectively destroyed cap.
Figure 4:
FIG. 4 is a high resolution electron micrograph of the tip region of a carbon nanotube treated as in FIG. 2a showing only a single tubular graphitic layer remaining.

The nanotube material was heat treated in a silica tube between silica wool plugs. The nanotube material was treated with a flow of 20 ml $min^{-1}$ $CO_2$ at 850° C. for 5 hours. A weight loss of 10 percent was measured. The surface area of the treated nanotube material was measured by the same method described above and found to be 31.7 $m^2g^{-1}$, and increase of about 51 percent over the freshly prepared, untreated nanotubes. After treatment with $CO_2$, a significant proportion, estimated at 5–10 percent, of the nanotubes had suffered corrosion in the cap region. HRTEM was performed on the $CO_2$ treated nanotubes in the same manner as described above and FIG. 2a shows that treatment by $CO_2$ had stripped graphitic layers off near the tip of the nanotubes and there was a short protruding inner tube of a type not observed prior to $CO_2$ treatment. All of the corrosion observed had occurred near the tip of the nanotube with no pitting or necking of the nanotubes away from the cap region. FIG. 2b shows a nanotube with a partially destroyed graphitic cap with some terminated fringes inside the tube and FIG. 2c shows a nanotube in which the cap has been completely destroyed, exposing the internal cavity with some amorphous material. A lower magnification micrograph of a $CO_2$ treated nanotube with a wide internal cavity is shown in FIG. 3 where it can be seen that graphitic layers of the cap have been selectively removed, although there appears to be a single remaining layer across the opening. FIG. 4 is a micrograph of a $CO_2$ treated nanotube showing the outer graphitic layers stripped off, leaving a single layer tube, which has not been previously observed. The scale bar in each of the above electron micrographs is 50 angstroms.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. A process for uncapping carbon nanotubes capped at their ends comprising: providing carbon nanotubes capped at their ends; contacting said carbon nanotubes capped at their ends with a reactant gas stream comprising a reactant gas capable of reacting with carbon in a capped region of said ends of said carbon nanotubes capped at their ends to form a gaseous product thereby opening at least one end of said carbon nanotube.

2. A process according to claim 1 wherein outer carbon layers of said nanotubes are reacted with said reactant gas thereby thinning said tubes.

3. A process according to claim 1 wherein said contacting is carried out at pressures of about $10^{-3}$ torr to about 200 bar.

4. A process according to claim 1 wherein said contacting is carried out at a pressure of about 1 to about 20 bar.

5. A process according to claim 1 wherein said contacting is carried out at a temperature of about −100° to about 2000° C.

6. A process according to claim 1 wherein said contacting is carried out at a temperature of about 500° to about 1000° C.

7. A process according to claim 1 wherein said reactant gas is flowed over said carbon nanotubes in a closed vessel and said gaseous product is removed from said closed vessel.

8. A process according to claim 1 wherein said reactant gas is selected from the group consisting of $CO_2$, $O_2$, $O_3$, $H_2O$, $NO$, $NO_2$, $N_2O$, $SO_2$, $H_2$, halogen, oxide of phosphorous, and mixtures thereof.

9. A process according to claim 1 wherein said reactant gas is selected from the group consisting of $CO_2$, $N_2O$, $O_2$, $H_2O$ and mixtures thereof.

10. A process according to claim 1 wherein said reactant gas comprises $CO_2$.

11. A process according to claim 1 wherein said reactant gas comprises a mixture of $CO_2$ and $O_2$.

12. A process according to claim 1 wherein said reactant gas comprises at least one oxide of nitrogen.

13. A process according to claims 1 wherein said reactant gas comprises $O_2$.

14. A process according to claim 1 wherein said reactant gas comprises at least one oxide of sulfur.

15. A process according to claim 1 wherein said reactant gas comprises at least one source of reactive halogen.

16. A process according to claim 1 wherein said reactant gas comprises $H_2$.

17. A process according to claim 1 wherein said reactant gas comprises $O_3$.

18. A process according to claim 1 wherein said reactant gas comprises $CO$.

19. A process according to claim 1 wherein said reactant gas stream comprises a diluent or carrier gas in volume of said reactant gas/said diluent or carrier gas of about 1/1 to about 1/20.

20. A process according to claim 19 wherein said diluent or carrier gas is selected from the group consisting of $N_2$, Ne, Ar, He, Kr, Xe, and mixtures thereof.

21. A process according to claim 1 wherein said reactant gas stream comprises another gas or vapor which enhances said reacting with carbon.

22. Carbon nanotubes comprising:
fillable, hollow carbon tubes, formed by a plurality of carbon tube layers, said tubes being open on at least one end and having an area adjacent said at least one open end formed by fewer than said plurality of carbon tube layers.

* * * * *